Patented Feb. 17, 1942

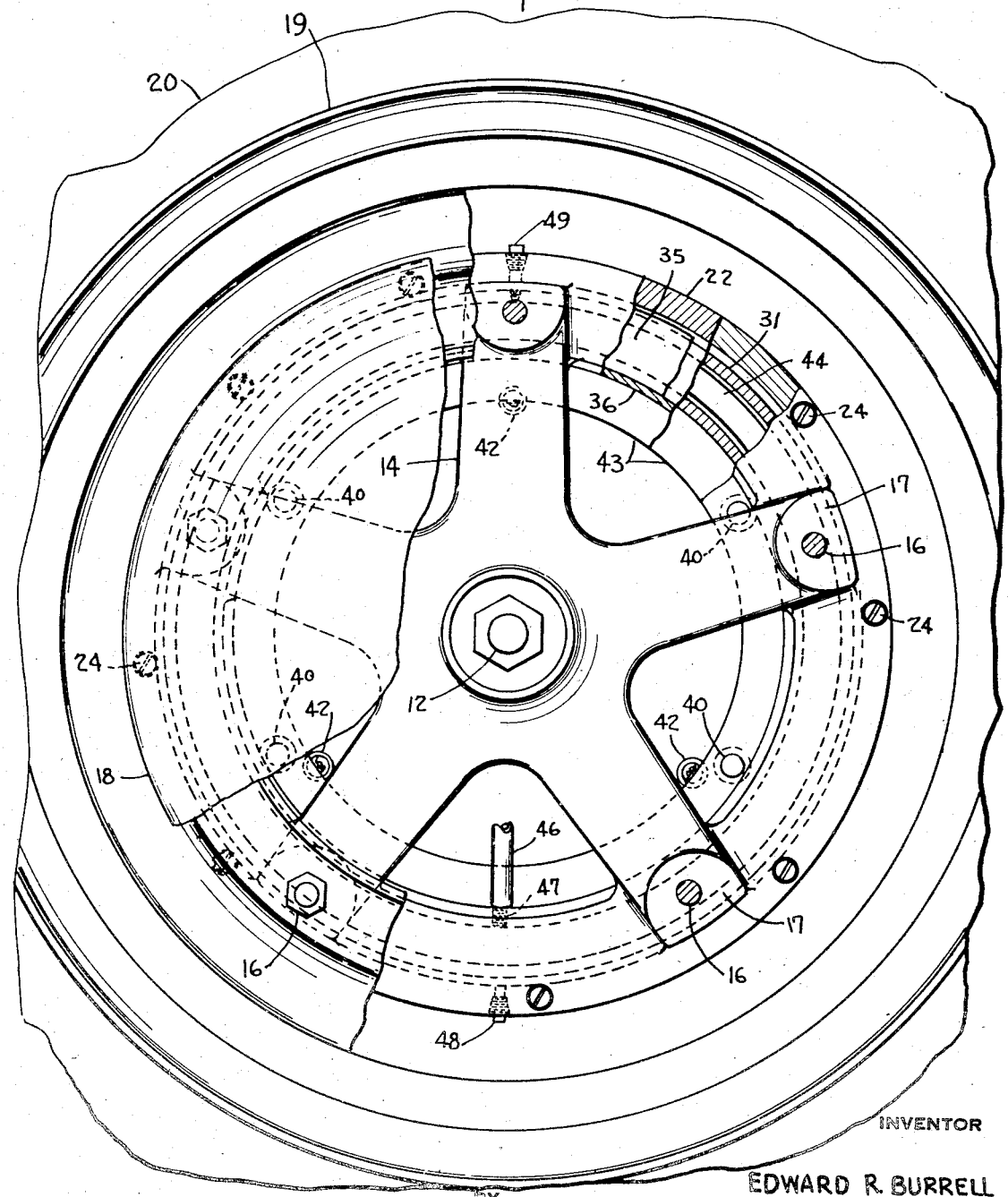

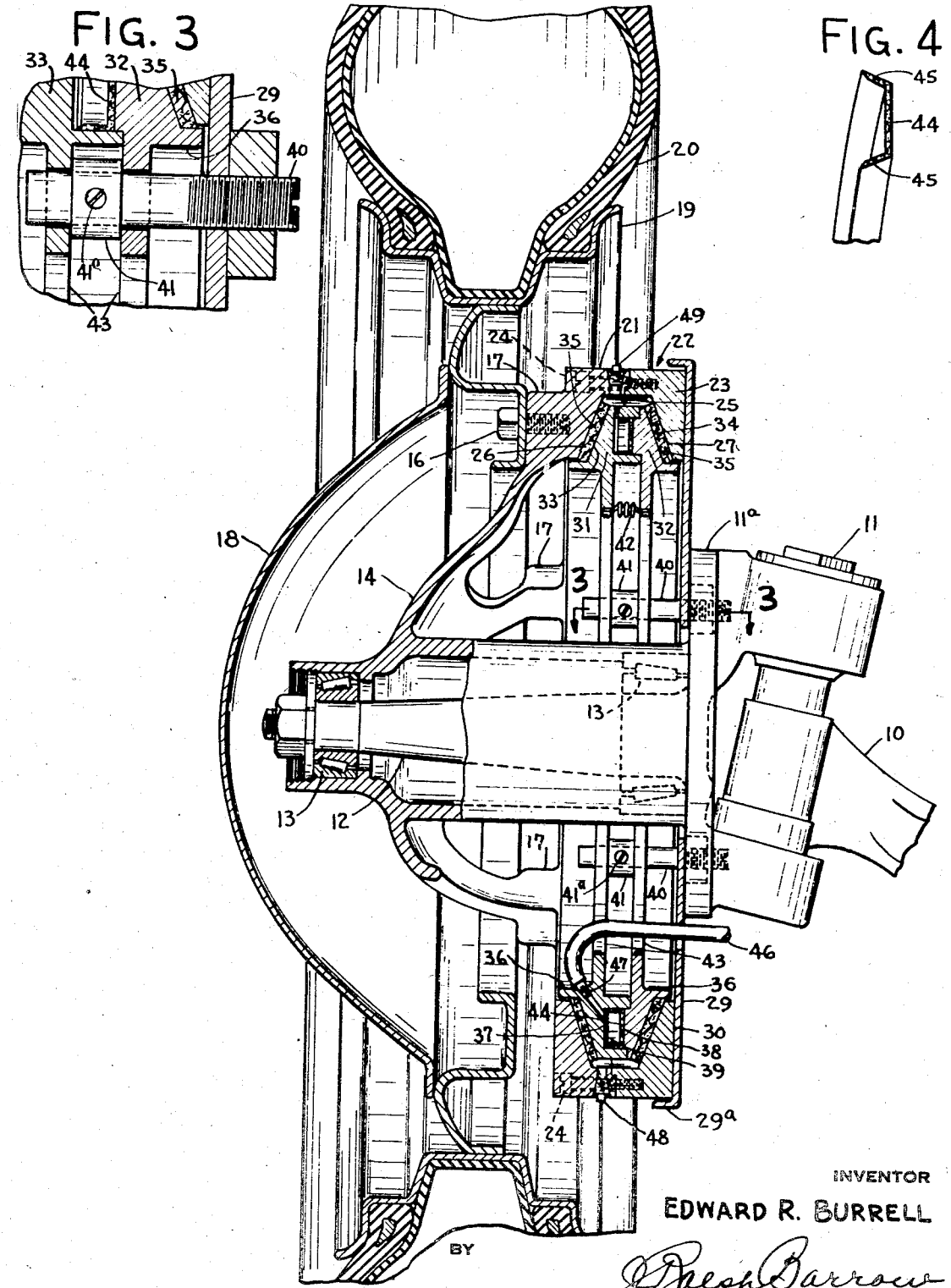

2,273,345

UNITED STATES PATENT OFFICE 2,273,345

BRAKE MECHANISM

Edward R. Burrell, Akron, Ohio

Application June 26, 1939, Serial No. 281,166

10 Claims. (Cl. 188—152)

This invention relates to brake mechanisms, and in particular, relates to hydraulic or fluid-pressure operated brakes.

An object of this invention is to provide a simple, inexpensive, and effective hydraulic or fluid-pressure operated brake mechanism, in which maximum braking surface is obtained with relatively small, compact brake drums.

Another object of the invention is to provide a brake mechanism of the character described in which annular brake shoes are shiftable to apply frictional braking power against cooperating surfaces of a drum, the brake shoes being self-centering to apply equalized pressure at all points about the brake surface.

Another object of the invention is to provide a brake mechanism, of the type utilizing annular brake shoes shiftable axially of the axis of a vehicle wheel to apply frictional braking power to the wheel, in which the necessity of securing the usual brake lining to the brake shoes is obviated, thereby facilitating the replacement of such linings, and increasing the mileage obtainable therefrom, reducing wear on the metallic friction surfaces, and eliminating screeching or squealing when the brakes are applied.

Another object of the invention is to provide a brake mechanism of the type described in the last paragraph, in which the brake shoes are axially shifted by means of hydraulic or fluid pressure, with means affected by the internal pressure of the pressure fluid to prevent leakage thereof from the fluid-pressure chamber.

Another object of the invention is to provide a brake mechanism of the character described in the last two paragraphs, means for eliminating grit and dirt from the interior of the brake drum without taking the mechanism apart.

Another object of the invention is to provide a brake mechanism of the character described, which is self-adjusting.

These and other objects will be manifest from the following brief description and the accompanying drawings.

Of the accompanying drawings:

Figure 1 is a front elevation, partly broken away and in section, having incorporated therein the improved brake mechanism embodying the invention.

Figure 2 is a cross-section taken substantially on line 2—2 of Figure 1.

Figure 3 is a fragmentary cross-section taken on line 3—3 of Figure 2.

Figure 4 is a perspective view of a portion of the annular sealing gasket before it is assembled in the fluid-pressure chamber of the brake mechanism.

Referring to the drawings, the numeral 10 designates the end of the front wheel axle upon which is swivelled, by means of a king-bolt 11, the usual non-rotatable spindle bracket 11ª carrying a spindle 12. Journalled on the spindle 12, through bearings 13, 13 may be hub 14 of a vehicle wheel upon which a wheel assembly, including the usual rim 19 and tire 20, is removably secured by means of studs 16, 16 threaded into bosses 17, 17 on the outer face of the hub.

Integral with hub 14 may be an annular portion 21 forming an outer section of a brake drum, indicated generally at 22, to which an inner annular section 23 is secured in registry therewith, by means of studs 24 extended through openings in the outer section and threaded into the inner section. On the inner periphery of drum 22 is an annular cavity 25, providing axially oppositely disposed annular friction surfaces 26 and 27 on the outer and inner sections 21 and 23, respectively, these friction surfaces preferably being conically shaped with the oppositely disposed surfaces extending at radially outwardly convergent angles with each other.

Non-rotatably secured to the spindle-bracket 11ª may be a backing plate or disc 29, against which the inner face 30 of drum member 23 is in sliding abutment, the disc 29 having an outwardly extending annular flange 29ª adjacent the outer periphery of the drum 22 to prevent dirt or moisture from getting between the drum and the disc 29.

Disposed within cavity 25 of brake drum 22 may be a pair of oppositely disposed annular brake shoes 31 and 32, arranged to be shifted axially to and from each other, the respective brake shoes having annular conical surfaces extending at angles corresponding with the conical surfaces 26 and 27 of drum 22. Interposed between the surfaces 26 and 27 and the conical surfaces 33 and 34, of the brake shoes may be pair of conically shaped bands 35, 35, of the usual friction resisting materials used for brake lining. These bands 35 preferably are molded in conical shape to conform accurately to the conical friction surfaces of the brake drum and brake shoes. No fastening means is necessary to secure the brake lining 35 on the brake shoes 31 and 32, the annular band 35 being allowed to float on the conical surfaces of the brake shoes, thus greatly reducing wear on the brake lining, preventing scoring of the friction surfaces of the drum, and eliminating screeching when the brake is applied, as compared with when rivets or other metal fastening means are used to secure the lining to the brake shoes. If desired, annular ribs 36, 36 may be provided on the brake shoes, extending outwardly of the shoes and slidably fitting against the inner surfaces of the drum 22 to aid in retaining the brake linings in centered position and to prevent dirt and moisture from getting to the braking surfaces.

The brake shoe 31 may be provided with an annular groove 37 for axially slidably receiving a relatively short annular rib 38 on brake shoe 32 to form an annular fluid-pressure chamber 39 between the shoes. To prevent rotation of the brake shoes 31 and 32, pins 40, 40 adjustably threaded into the backing disc 29, may be snugly but loosely received through annular flanges 43, 43, extending radially inwardly from the brake shoes, and the pins 40 may have spacers 41, 41 adjustably secured thereon, as by means of screws 41ª, for limiting relative movement of the brake shoes toward each other in the normal inoperative positions of the respective brake shoes. Springs 42, 42 may extend between the annular ribs 43 of the brake shoes, normally yieldingly to urge the shoes toward each other as limited by abutment with spacers 41. With this construction the brake drum 22 may be taken apart and the two brake shoes 31 and 32 removed therefrom as a unit, without losing any of the pressure fluid from chamber 39.

To prevent pressure fluid from leaking between the joints of brake shoes 31 and 32, an annular channel-shaped gasket 44 of flexible or resilient material, such as rubber, may be inserted in the pressure-chamber 39 with the back of the channel abutting the flat surface of rib 38 of brake shoe 32. As best shown in Figure 4, gasket 44 preferably is formed or molded with the flanges 45 thereof extending angularly of the gasket, whereby when the gasket is inserted in place, the flanges 45 will be urged into substantial sealing engagement with the radially opposite walls of fluid chamber 39, because of the inherent tendency of gasket 44 to resume its normal molded shape. When pressure is applied within the chamber 39, it further urges the flanges 45 of the gasket into tight sealing engagement with the radially opposite walls of chamber 39, and against rib 38 of brake shoe 32, so that the greater the pressure within chamber 39, the more effective becomes the gasket 44 to seal the pressure chamber 39 against leakage of pressure-fluid therefrom.

The pressure-chamber 39, normally is filled with fluid not under pressure, this fluid being supplied from a suitable source, not shown, through a flexible conduit 46 connected to a nipple 47, the latter being threaded into brake shoe 31 to communicate with the chamber 39 at the open side of channel gasket 44.

When the pressure within the chamber 39 is increased, brake shoes 31 and 32 are forced apart against the yielding action of spring 42 to engage lining 35 between the cooperating conical friction surfaces of the brake drum and brake shoes, thereby transmitting frictional braking power from the non-rotatable brake shoes to the rotatable brake drum to stop rotation of wheel 18. This frictional braking power is directly proportionate to the angle of the conical friction surfaces, the power decreasing as the angles more nearly approach 90° to the axis of the wheel.

At diametrically opposite points in section 21 of the drum 22, may be threaded plugs 48 and 49, adapted to be removed for injection of suitable fluid under pressure, such as air, through one plug opening to flush out the cavity 25, whereby grit, such as grinding from the friction surfaces, is forced out of the cavity through the other plug opening. The openings for plugs 48 and 49, being on the outer periphery of the drum, do not affect the wear of the brake linings.

In the operation of the brake mechanism it is assumed that the drum 22 is rotating with wheel 18, while the brake shoes 31 and 32 are normally urged together, out of braking engagement with the drum, by the springs 42. To brake the wheel against rotation, the usual pedal-operated fluid valve (not shown) is actuated to increase the fluid-pressure within chamber 39, thereby yieldingly urging the brake-shoes apart and applying frictional braking power between the respective conical friction surfaces of the brake shoes and the brake drum, through the brake linings 35. Since the brake shoes 31 and 32 substantially float on pins 40, 40, the brake shoes and the respective linings 35 therefor will tend to center themselves co-axially relative to the conical friction surfaces 26 and 27 of the drum 22, so that all friction surfaces will wear substantially uniformly. Since the internal pressure within pressure-chamber 25 is uniform at all points therein, full pressure is not effective until all opposing friction surfaces are fully engaged, thus eliminating any tendency of the brakes to grab or chatter when the pressure is initially applied within the chamber 39.

Upon relieving the pressure within chamber 39, the springs 42 yieldingly urge the brake shoes together to disengage the brakes, and to permit free rotational movement of the wheel 18 on the spindle 12.

Thus, has been provided a simple, effective, hydraulic or fluid-pressure actuated brake mechanism in which, because of the uniform pressure applied to the braking surfaces, and because the use of metallic or other fastening means to secure the brake linings to the brake shoes has been obviated, the wearing parts of the brake will last substantially longer without repair or replacement than has heretofore been possible, and screeching or squealing of the brakes when pressure is applied is eliminated.

Modifications of the invention may be resorted to without departing from the spirit thereof or the scope of the appended claims.

What is claimed is:

1. A brake comprising a rotatable member having a conical friction surface thereon, a non-rotatable annular element having a conical friction surface thereon for frictional engagement with said surface on said member, means for non-rotatably and loosely but snugly supporting said element to float relatively of said member and to be axially shiftable relatively of said member, and annular fluid-pressure means for axially urging said annular element into frictional engagement with said member to brake the same, said fluid-pressure means applying uniform pressure about said frictionally engaging surfaces, whereby said element will be self-centering on said member.

2. A brake comprising a rotatable member having a pair of axially spaced conical friction surfaces thereon, a pair of non-rotatable annular elements having conical friction surfaces thereon for frictional engagement with said surfaces of said members, means for non-rotatably and loosely but snugly supporting said elements to float relatively of said members and to be axially shiftable to and from each other, said elements being shiftable axially apart into frictional engagement with said friction surfaces on said member to brake the same, and annular fluid-pressure means between said annular elements for axially urging said elements apart to engage said friction surfaces with uniform pressure at all points, whereby the conical surfaces of said elements will be self-centering on the conical surfaces of said member.

3. A brake comprising a rotatable member having axially spaced conical surfaces thereon, a pair of non-rotatable annular elements between said spaced surfaces, said elements having conical surfaces for frictional engagement with said spaced surfaces, means for non-rotatably and loosely but snugly supporting said elements to float relatively of said members and to be axially shiftable thereon, interengaging means on both of said elements permitting the same to be axially slidable to and from each other on said supporting means and forming an annular fluid-pressure chamber between the annular elements, said elements being shiftable axially apart by application of fluid-pressure in said chamber for engaging said conical surfaces to brake said rotatable member.

4. A brake comprising a rotatable member having axially spaced conical surfaces thereon, a pair of elements non-rotatably mounted between said spaced surfaces, each of said elements having an annular conical surface in spaced parallel relation to a conical surface on said member, means for non-rotatably supporting said elements to be axially shiftable thereon, conically shaped annular brake linings of friction resisting material loosely interposed to float between said parallel surfaces for frictional engagement therewith when said elements are shifted axially apart, and interengaging means on said elements permitting the same to be axially slidable relative to each other and providing an annular fluid-pressure chamber between the elements, said elements being shiftable axially apart by application of fluid-pressure in said chamber to brake said rotatable member, whereby said floating linings will be self-centering when braking power is applied to said rotatable members.

5. A brake comprising a rotatable member having axially spaced conical surfaces thereon, a pair of elements non-rotatably mounted between said spaced surfaces, each of said elements having a conical surface in spaced parallel relation to a conical surface on said member, means for non-rotatably supporting said elements to be axially shiftable thereon and to float relatively of said member, annular brake linings of friction resisting material, means on said elements for loosely retaining said linings to float between said parallel surfaces for frictional engagement therewith when said elements are shifted axially apart, interengaging means on said elements permitting the same to be axially slidable relative to each other and providing an annular fluid-pressure chamber between the elements, said elements being shiftable axially apart by application of fluid-pressure in said chamber to brake said rotatable member, and fluid sealing means in said chamber expansible by application of pressure therein to seal the joint between said elements against leakage of pressure fluid, said elements and said linings being self-centering when braking power is applied to said rotatable member.

6. A brake comprising a rotatable member having axially spaced annular conical surfaces thereon, a pair of non-rotatable elements between said spaced surfaces, said elements having annular conical surfaces for frictional engagement with said spaced surfaces, means for non-rotatably and loosely but snugly supporting said elements to float relatively of said members and to be axially shiftable relatively of said members, interengaging means on both of said elements permitting the same to be axially slidable to and from each other on said supporting means and forming an annular fluid-pressure chamber between the elements, and fluid sealing means in said chamber expansible by application of pressure therein to seal the joint between said elements against leakage of pressure fluid, said elements being shiftable axially apart by application of fluid pressure in said chamber for engaging said conical surfaces to brake said rotatable member.

7. A brake comprising a rotatable drum, one or more non-rotatable elements axially shiftable within said drum for engagement with the sides thereof to brake the drum, said drum having openings communicating with the interior thereof for circulation of cleaning fluid through the drum to remove accumulated grit or the like therefrom, and removable closure means for said opening.

8. A brake comprising a rotatable drum having oppositely disposed conical surfaces at the sides thereof, said surfaces converging radially outwardly of each other, a pair of non-rotatable elements axially shiftable apart for engaging said drum surfaces to brake said drum, said drum providing an annular cavity between the outer wall thereof and said elements, said drum having openings communicating with the interior thereof for circulating fluid into said cavity to remove accumulated grit or the like from said cavity, and removable closure means for said openings.

9. A brake comprising a rotatable member having a pair of axially spaced conical friction surfaces thereon, said surfaces converging radially outwardly of each other, a pair of non-rotatable elements having conical annular friction surfaces thereon for frictional engagement with said surfaces of said members, means for non-rotatably and loosely but snugly supporting said elements to float relatively of said members and to be axially shiftable to and from each other, said elements being shiftable axially apart into frictional engagement with said friction surfaces on said member to brake the same, and annular fluid-pressure means between said elements for axially urging said elements apart to engage said friction surfaces with uniform pressure at all points, whereby the conical surfaces of said elements will be self-centering on the conical surfaces of said member.

10. A brake comprising a rotatable member having axially spaced conical surfaces thereon, a pair of elements non-rotatably mounted between said spaced surfaces, each of said elements having a conical surface in spaced parallel relation to a surface on said member, means for non-rotatably supporting said elements to be axially shiftable thereon, interengaging means on each of said elements permitting the same to be axially slidable relative to each other and providing an annular fluid-pressure chamber between the elements, said elements being shiftable axially apart by application of fluid pressure in said chamber to brake said rotatable member, fluid-sealing means in said chamber expansible by application of fluid-pressure therein to seal the joints between said elements against leakage of pressure fluid, stop means axially adjustable on said supporting means to be engageable by said elements, and yieldable means for yieldingly urging said elements into abutment with said stop means normally to retain the elements out of braking relation with said member.

EDWARD R. BURRELL.